(12) United States Patent
Fink et al.

(10) Patent No.: US 7,768,383 B2
(45) Date of Patent: Aug. 3, 2010

(54) METHOD FOR LOCALIZING WHEEL ELECTRONICS SYSTEMS

(75) Inventors: Alexander Fink, Dittelbrunn (DE); Frank Fischer, Regensburg (DE); Gregor Kuchler, Regensburg (DE)

(73) Assignee: Siemens VDO Aotomotive AG, Munich (DE)

( * ) Notice: Subject to any disclaimer, the term of this patent is extended or adjusted under 35 U.S.C. 154(b) by 299 days.

(21) Appl. No.: 11/948,268

(22) Filed: Nov. 30, 2007

(65) Prior Publication Data

US 2008/0129478 A1     Jun. 5, 2008

(30) Foreign Application Priority Data

Nov. 30, 2006   (DE) .................. 10 2006 056 965

(51) Int. Cl.
    *B60C 23/00*   (2006.01)
(52) U.S. Cl. ................. 340/447; 340/442; 73/146.5
(58) Field of Classification Search ................. 340/447, 340/442, 444–446, 426.33, 672, 933; 73/146.5; 180/197, 219
    See application file for complete search history.

(56) References Cited

U.S. PATENT DOCUMENTS

| | | | |
|---|---|---|---|
| 6,948,359 B2 * | 9/2005 | Proschka | 73/146.5 |
| 7,116,217 B2 * | 10/2006 | Okubo | 340/445 |
| 7,487,670 B2 * | 2/2009 | Fink et al. | 73/146.5 |
| 2003/0058118 A1 * | 3/2003 | Wilson | 340/442 |
| 2005/0024192 A1 * | 2/2005 | Desai | 340/445 |
| 2005/0187667 A1 * | 8/2005 | Vredevoogd et al. | 340/442 |
| 2006/0001535 A1 | 1/2006 | Hafele et al. | |
| 2006/0017554 A1 | 1/2006 | Stewart et al. | |
| 2007/0182531 A1 * | 8/2007 | Kuchler | 340/442 |
| 2008/0191855 A1 * | 8/2008 | Fink et al. | 340/447 |

FOREIGN PATENT DOCUMENTS

| | | |
|---|---|---|
| EP | 0760299 A1 | 3/1997 |
| EP | 1621366 A1 | 2/2006 |

\* cited by examiner

*Primary Examiner*—John A Tweel, Jr.
(74) *Attorney, Agent, or Firm*—Laurence A. Greenberg; Werner H. Stemer; Ralph E. Locher

(57) ABSTRACT

A method for localizing individual wheels and/or wheel identifiers of individual wheels of a double wheel of a motor vehicle includes the following steps: determining the axle of the respective double wheel; determining the motor vehicle side of the respective double wheel; determining the position of the respective double wheel by the position of the axle and the position of the motor vehicle side; determining the direction of travel of the motor vehicle; determining the direction of rotation of the individual wheels and/or wheel identifiers of the respective double wheel; localization of the individual wheels and/or wheel identifiers of the individual wheels by the position of the associated double wheel, the direction of travel of the motor vehicle and the rotational directions of the individual wheels and/or wheel identifiers.

7 Claims, 1 Drawing Sheet

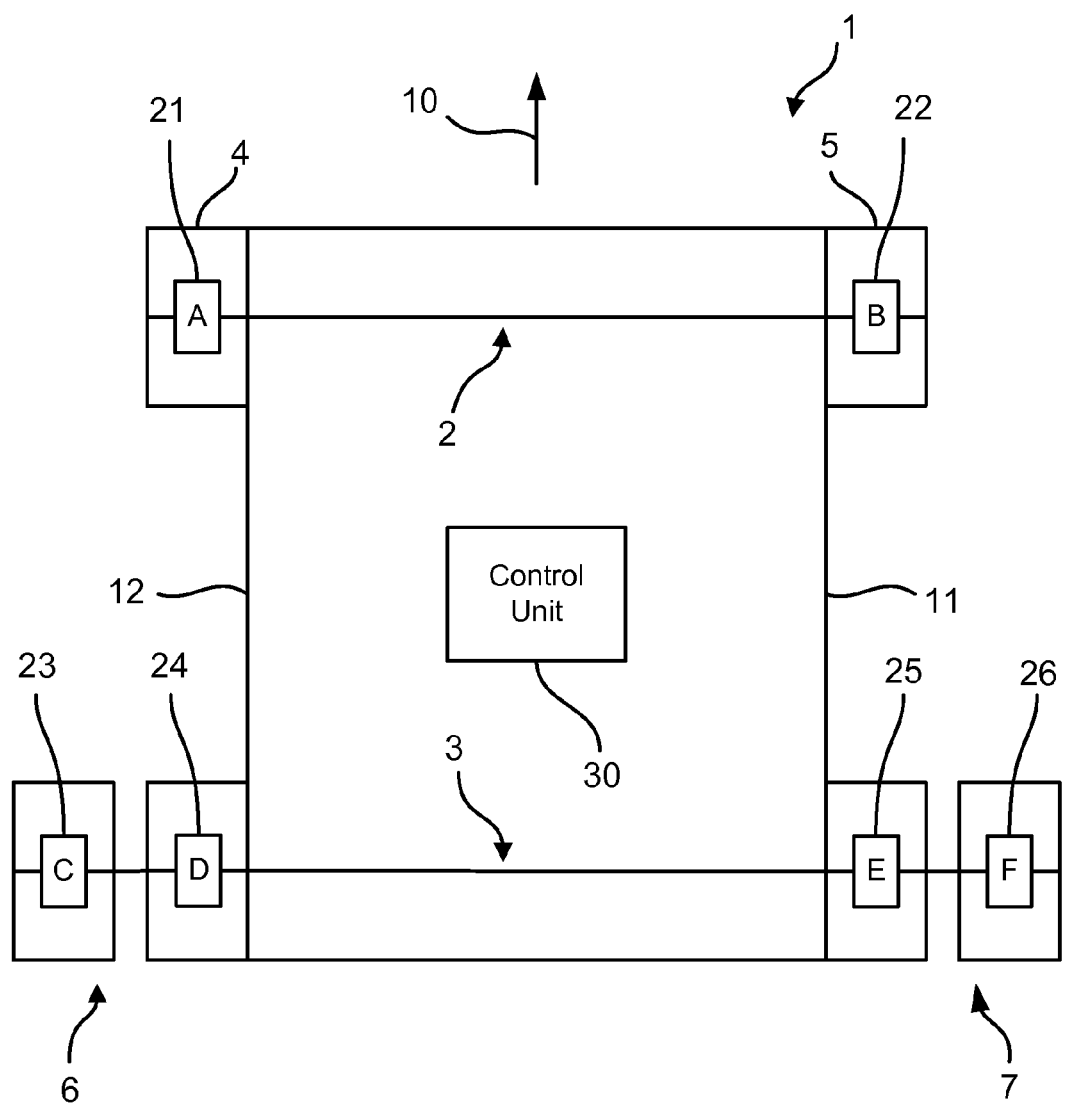

_METHOD FOR LOCALIZING WHEEL ELECTRONICS SYSTEMS_

CROSS-REFERENCE TO RELATED APPLICATION

This application claims the priority, under 35 U.S.C. §119, of German patent application DE 10 2006 056 965.2, filed Nov. 30, 2006; the prior application is herewith incorporated by reference in its entirety.

BACKGROUND OF THE INVENTION

Field of the Invention

The invention relates to a method for localizing wheel electronics systems, i.e., for localizing individual wheels and/or wheel identifiers of individual wheels of a double wheel of a motor vehicle.

Prior art tire pressure monitoring systems include a wheel electronics unit, which is mounted in the wheel, a number of antennas and/or receivers and a central control unit. The wheel electronics system includes pressure sensors, which measure the tire pressure and transmit the data to the corresponding receiver by way of antennae. The receiver is connected to a control unit. This transmission is usually carried out using high frequency and/or radio frequency signals. The control unit subsequently processes the data and generates warnings to the driver, in the event that the tire deviates from a desired pressure.

One object of tire pressure monitoring systems is the so-called automatic localization. This function automatically determines the mounted position of the wheel electronics system in the wheel and thus the position of the wheel. Knowledge of the mounted position of the corresponding wheel electronics system enables warnings in respect of a faulty pressure value of a tire, in conjunction with the associated wheel position, to be displayed on a display for the driver.

European published patent application EP 0 760 299 A1 describes that a wheel sensor determines the rotational direction of the wheel and transmits this information using a high frequency (HF) signal to a receiving unit and/or a control unit. In that process, the rotational direction information of the wheel is used to determine the mounting position of the wheel in respect of the side of the motor vehicle.

The position information from the wheel electronics system is usually programmed within the scope of diagnosis commands, which, in the case of tire pressure monitoring systems, is stored in the control unit. Localization is not carried out automatically in such cases.

With a double tire configuration, which is often used in commercial vehicles, such as buses, heavily loaded vehicles, heavy trucks for instance, the question of making a distinction between the inner and the outer wheel of a double wheel also arises.

Prior art systems use low frequency (LF) trigger signals, in order to determine the position of the double tires. In such systems individual trigger units are mounted in very close proximity to the tire. The trigger units transmit signals to the wheel electronics systems, which for their part emit a radio frequency signal which contains information that the signal involved was emitted by means of triggering. As the coverage of LF signals is restricted, only individual wheel electronics systems which are mounted in close proximity to the trigger unit receive a trigger signal. When the trigger process is implemented in a specific fashion, e.g. in a specific sequence, the control unit can assign the wheel electronics system to the positions in accordance with the trigger units.

In principle, the distinction between the inner and outer wheels can thus also be carried out on the basis of LF triggering. This approach nevertheless requires a high technical outlay, in order to mutually exclude interference signals and to prevent multiple responses of the wheels from double wheel positions.

For axle localization, i.e. the distinction between the front axle and the rear axle, a received telegram of the wheel electronics system is usually analyzed in respect of its high frequency (HF) field strength. This approach can likewise be used for the inner and outer localization of double wheels. The technical outlay is however also extremely high there. This results solely from the fact that many parameters can influence the HF field strength and these possible influences must be accounted for during implementation. That solution is thus not effective in the field of wheel localizations.

SUMMARY OF THE INVENTION

It is accordingly an object of the invention to provide a method of localizing motor vehicle wheel units which overcomes the above-mentioned disadvantages of the heretofore-known devices and methods of this general type and which enables localizing inner and outer wheels of a double wheel of motor vehicles and which, in comparison with the prior art, requires a lower technical outlay.

With the foregoing and other objects in view there is provided, in accordance with the invention, a method of localizing individual wheels and/or wheel identifiers of individual wheels of a double wheel of a motor vehicle, the method which comprises the following steps:

determining an axle of the respective double wheel;

determining a motor vehicle side of the respective double wheel;

determining a position of the respective double wheel by a position of the axle and a position of the motor vehicle side;

determining a direction of travel of the motor vehicle;

determining the rotational direction of the individual wheels and/or wheel identifiers of the respective double wheel; and localizing the individual wheels and/or wheel identifiers of the individual wheels by the position of the associated double wheel, the direction of travel of the motor vehicle and the rotational directions of the individual wheels and/or wheel identifiers.

In accordance with a preferred embodiment of the invention, the side of the motor vehicle on which the overall double wheel is arranged is determined by a signal, which was emitted by a wheel electronics system to a control unit, with the signal having been triggered by a trigger signal and with it being defined in the control unit that a specific motor vehicle side is assigned by means of an identifier which is transmitted with the signal.

In a further preferred embodiment of the invention, the axle of the motor vehicle, on which the respective double wheel is arranged, is determined by an evaluation of different field strengths of the radio frequency signals emitted by the wheel electronics system.

Provision is expediently made for the measures described for the determination of the motor vehicle side and/or the axle to be used accordingly for the respective other application.

In a further preferred embodiment of the invention, the direction of travel of the motor vehicle is obtained from the information as to which gear is engaged in the motor vehicle.

In a further preferred embodiment of the invention, the rotational direction of the individual wheels and/or wheel identifiers of the respective overall double wheel is determined with an acceleration measurement.

The inner and outer wheel of a double wheel are mounted in relation to the two wheels themselves in a mirrored arrangement. This results in different rotational directions of the wheel electronics system and correspondingly the wheel sensors, which are conventionally mounted in the same way. The two wheel electronics systems of a double wheel will consequently each determine rotational directions which are opposite to one another. This item of information is sent to the receiving unit and used for the localization of the inner and/or outer wheel of the double wheel.

In addition, the motor vehicle side, i.e. left or right, of the double wheel can be determined with a signal transmitted by a LF trigger signal. With the information relating to on which axle, i.e. front or rear, the double wheel is arranged, which one obtains by analyzing the field strength of the emitted radio frequency signals, and the knowledge of the direction, in which the motor vehicle is moving overall, the rotational direction information is used in order to determine the individual wheel position and/or identifier of a wheel within a double wheel.

The proposed invention thus enables a completely automatic localization of individual wheels of a double wheel, if the position of the overall double wheel is known from a predetermined signal sequence for instance, which is evoked by an LF triggering or an evaluation of different HF field strengths.

Compared with the LF and/or HF-based solutions, which can likewise also determine the inner and outer wheel position in addition to the axle and side localization, the present invention significantly reduces the technical outlay required for the localization of individual wheels in a double wheel arrangement.

In comparison with the solution of manually programming the position of a wheel electronics system into the control unit of a tire pressure monitoring system, the present invention enables a completely automatic localization, which increases customer-friendliness and flexibility.

Other features which are considered as characteristic for the invention are set forth in the appended claims.

Although the invention is illustrated and described herein as embodied in method for localizing wheel electronics systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing FIGURE.

BRIEF DESCRIPTION OF THE DRAWING

The FIGURE is a schematic representation of an exemplary motor vehicle having a double wheel on both ends of the rear axle.

The following description of a preferred embodiment of the present invention uses the same reference characters to reference identical or comparable components.

DETAILED DESCRIPTION OF THE INVENTION

Referring now to the sole FIGURE of the drawing in detail, there is shown a motor vehicle 1 with two double tires 6, 7 in a so-called 4×2 configuration, i.e., with two individual wheels 4, 5 on the front axle 2 and two double wheels 6, 7 on the rear axle 3. The wheel electronics systems 21, 22, 23, 24, 25, and 26 in each wheel include identifiers A, B, C, D, E, F, which, in accordance with the FIGURE, are assigned to the wheels 4, 5 and the individual wheels of the double wheels 6, 7. Each of the wheel electronics systems 21, 22, 23, 24, 25, and 26 emit a signal to a control unit 30.

The wheels 4, 5 with the identifiers A and B can be assigned for instance by the evaluation of the field strength of a high frequency (HF) field. The localization of at least one of the two vehicle sides 11, 12, i.e. left or right and/or the identifiers A and B can be determined with the rotational direction and the direction of travel 10. The rotational direction of a wheel can be measured with an acceleration sensor for instance, which is disposed in the wheel.

The localization of the two axles 2, 3 of the double wheels 6, 7 can be implemented for instance by the evaluation of different HF field strengths. Furthermore, it is possible to determine that the double wheels are positioned on the rear axle 3.

The respective vehicle side 11, 12 of the vehicle 1, on which the double wheels 6, 7 are arranged, can be determined with a low frequency (LF) triggering for instance.

In the example of the FIGURE this thus results in the double wheel 6 being assigned to the left side 12 of the rear axle 3 and the double wheel 7 being assigned to the right side 11 of the rear axle 3.

Since the positions of the double wheels 6, 7 are known, the positions of the respective individual wheels are determined with the identifiers C, D for the double wheel 6 and E, F for the double wheel 7. The determination as to whether the individual wheel of a double wheel 6, 7 is arranged at the inner or outer position of the respective double wheel 6, 7, is obtained by means of the respective rotational direction of the relevant individual wheel while simultaneously observing the overall direction of travel 10 of the motor vehicle 1. This allows the identifier C of the wheel 6 to be assigned to the outer position and the identifier D to be assigned to the inner position of the left double wheel 6. Similarly, the identifiers E and F can be accordingly assigned to the inner and/or the outer position of the double wheel 7 on the rear axle 3.

The present invention is particularly suited to localizing double wheels of motor vehicles.

The invention claimed is:

1. A method of localizing individual wheels and/or wheel identifiers of individual wheels of a double wheel of a motor vehicle, the method which comprises the following steps:
   determining an axle of the respective double wheel;
   determining a motor vehicle side of the respective double wheel;
   determining a position of the respective double wheel by a position of the axle and a position of the motor vehicle side;
   determining a direction of travel of the motor vehicle;
   determining the rotational direction of the individual wheels and/or wheel identifiers of the respective double wheel; and localizing the individual wheels and/or wheel identifiers of the individual wheels by the position of the associated double wheel, the direction of travel of the motor vehicle and the rotational directions of the individual wheels and/or wheel identifiers.

2. The method according to claim 1, which comprises determining the axle of the motor vehicle, on which the respective double wheel is arranged, by evaluating different field strengths of radio frequency signals emitted by the wheel electronics systems.

3. The method according to claim 1, which comprises determining the axle of the motor vehicle, on which the overall double wheel is arranged, by way of a signal emitted by a wheel electronics circuit to a control unit, with the signal having been triggered by a trigger signal, and defining the specific axle with the control unit by way of an identifier, which is transmitted with the signal.

4. The method according to claim 1, which comprises determining the motor vehicle side of the motor vehicle, on which the respective double wheel is arranged, by an evaluation of different field strengths of radio frequency signals emitted by the wheel electronics system.

5. The method according to claim 1, which comprises determining the vehicle side of the motor vehicle, on which the overall double wheel is arranged, by way of a signal, emitted by a wheel electronics system to a control unit, with the signal having being triggered by a trigger signal, and defining the specific motor vehicle side with the control unit by way of an identifier, which is transmitted with the signal.

6. The method according to claim 1, which comprises determining the direction of travel of the motor vehicle by acquiring information as to which gear is engaged in the motor vehicle.

7. The method according to claim 1, which comprises determining the rotational direction of the individual wheels and/or wheel identifiers of the respective overall double wheel with an acceleration measurement.

* * * * *